(No Model.)
I. L. ROBERTS.
WAVE POWER APPARATUS.
No. 262,694. Patented Aug. 15, 1882.
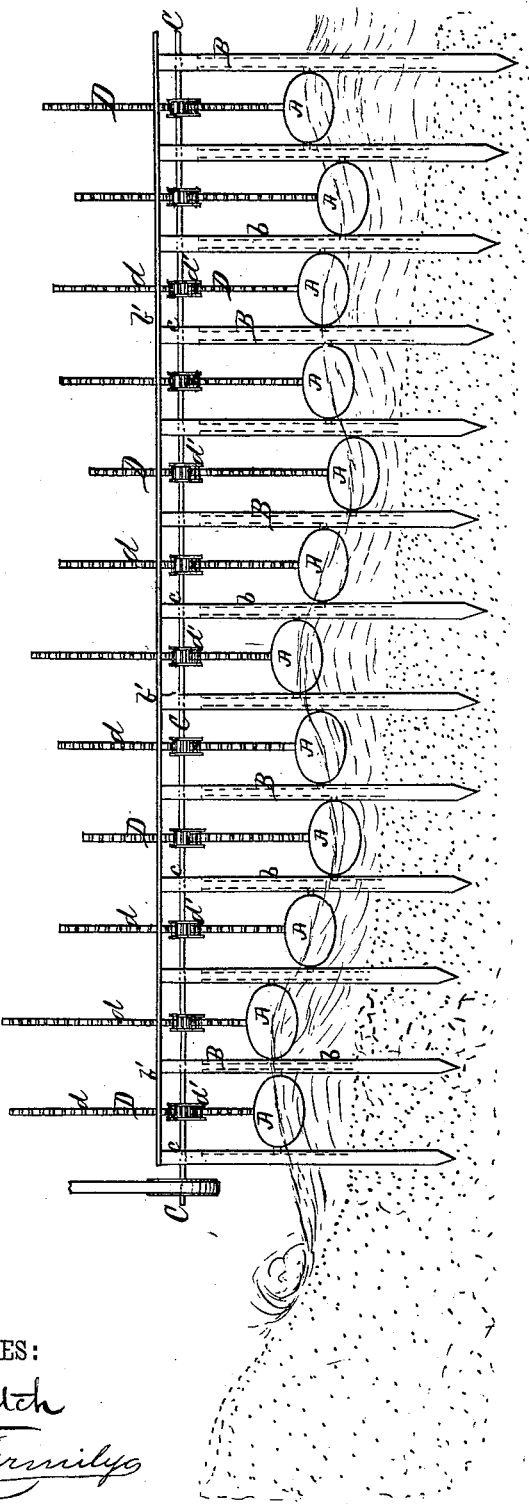
WITNESSES:
INVENTOR
BY
ATTORNEY

UNITED STATES PATENT OFFICE.

ISAIAH L. ROBERTS, OF JACKSONVILLE, FLORIDA, ASSIGNOR TO DEMAS BARNES, OF BROOKLYN, NEW YORK.

WAVE-POWER APPARATUS.

SPECIFICATION forming part of Letters Patent No. 262,694, dated August 15, 1882.

Application filed December 16, 1881. (No model.)

*To all whom it may concern:*

Be it known that I, ISAIAH L. ROBERTS, of Jacksonville, Duval county, Florida, have invented an Improved Wave-Power Apparatus, of which the following is a full, clear, and exact description, reference being had to the accompanying drawing, forming part of this specification.

My invention relates to an apparatus for utilizing the motion of the waves or swells of a sea or other body of water to produce the continuous and uninterrupted rotation in one direction of a shaft; and it consists in an apparatus composed of a series of buoys or equivalent structures extending out from the line of the coast or shore of the body of water, with the longitudinal axis of the series at an angle to a line drawn at right angles to the direction of the travel or movement of the waves or swells, and reaching over a number or succession of said waves or swells, so that at all times some of the buoys of the series shall be falling while others are rising, together with a power-shaft common to all the buoys of the series, and mechanism intermediate said buoys and shaft which rotates the shaft in one direction by the reciprocatory movement of the buoys, whereby the shaft is rotated continuously and uninterruptedly in one direction, as hereinafter particularly set forth.

The drawing is a side elevation of an apparatus embodying my invention, and showing the same in proper position in the water of a sea.

In the drawing, A A A constitute a series of buoys or equivalent structures extended out in a line from the coast or shore of a sea or other body of water, and with the longitudinal axis of the series at an angle to a line drawn at right angles to the direction of the travel or movement of the waves or swells, the series being of sufficient length to reach over the distance of such a number or succession of waves or swells that at all times some of the buoys of the series will be falling while others are rising under the action of said waves or swells. In the drawing, the waves or swells are shown in vertical section.

The buoys should be provided with means for holding them in their designated position, and also so that their rise and fall in the waves shall be in substantially vertical lines. I find it preferable to accomplish this by providing a frame-work, B, in which the series of buoys is confined so far as lateral movement is concerned, they being free to move vertically. This frame-work may be composed of piles *b*, driven into the sea-bottom, a pile being located between the adjacent buoys, or one upon either side of each buoy as said buoy faces abreast of the waves, the piles being tied together by a bar or beam, *b'*, bolted along the tops of the piles, or in any other desired manner. The buoys may have lugs or spurs running in ways which are longitudinal of the piles, as shown, to guide the buoys in their vertical movements in the waves.

At C is shown a shaft which is common to all the buoys of the series, and which may extend the length of the apparatus over the line of the longitudinal axis of the series, as shown, and may be seated in suitable bearings, *c*, on the top of the frame. Intermediate said buoys and shaft is suitable mechanism, D, which will operate to rotate the shaft in one direction by the reciprocatory movement of the buoys. This mechanism may be any of the well-known devices employed to cause a rotary motion in a shaft by the reciprocatory motion of another body—such, for instance, as a ratchet-bar engaging a gear turning loosely on the shaft, said gear being provided with dogs or other detents which work in ratchets facing in opposite directions, fixed on the shaft, so that when the bar is moved in one direction and rotates the gear one of the dogs will engage its corresponding ratchet on the shaft, and thus rotate the shaft in one direction more or less, and when the bar is moved in the opposite direction the other dog on the gear will engage its ratchet-wheel on the shaft and rotate the shaft in the same direction.

In the drawing, the ratchet-bar is seen at *d*, fixed at one end to the buoy, and with its other end extending upward beyond the line of the shaft. The gear turning on the shaft is seen at *d'*. In the hollow of the gear *d'*, and consequently concealed from view in the drawing, are the dogs or other detents, which work into ratchet-wheels having oppositely-turned faces fixed on the shaft. This mechanism D is placed intermediate each of the buoys of the series and the shaft. Of course I do not limit myself to the use of the described mechanism intermediate the shaft and buoys, as any other devices which will employ the intermittent reciprocatory motion of the buoys of the series to rotate the shaft may be used. I find it preferable, however, to have this mechanism so constructed that each buoy will operate to rotate the shaft only during its fall or descent, the buoys being free to rise or move upward on the waves or swells. This may be readily accomplished in the described clutch device by having but a single dog or detent working on a ratchet-wheel on the shaft, and so arranged that it will be in engagement during the descent of the bar and out of engagement during the ascent of the bar. The buoys are then free to receive the full "lift" of the waves or swells, and to be raised to the crest thereof, and they rotate the shaft in falling by their own gravity.

It is evident that the buoys may not have a direct connection with the shaft C, but that each buoy may, by suitable mechanism, either during its ascent or descent in the waves, be caused to raise a weight, and that the fall of each of these weights may be utilized to rotate a common shaft continuously and in one direction.

It is evident that by means of my improved apparatus, constructed and arranged as described, with a series of buoys extending out from the coast-line into the water, the longitudinal axis of said series being at an angle to a line drawn at right angles to the direction of the travel or movement of the waves or swells, and reaching over a number of said waves or swells, and with mechanism intermediate said buoys and a shaft common to all the buoys of the series, as described, the motion of the successive waves or swells will cause some of the buoys of the series to be at all times rising while others are falling, and the shaft C will be consequently continuously and uninterruptedly rotated in one direction. The power thus generated in the shaft may be taken therefrom by any suitable means and be employed for various purposes.

What I claim as my invention, and desire to secure by Letters Patent, is—

An apparatus for utilizing the wave or swell motion of a body of water to continuously and uninterruptedly rotate in one direction a shaft, composed of a series of buoys extended out from the coast or shore of the body of water over the distance of such a number or succession of the waves or swells that some of the buoys of the series will be at all times rising while others are falling, and with the longitudinal axis of said series at an angle to a line drawn at right angles to the direction of the travel or movement of said waves or swells, together with a shaft common to all the buoys of the series, and mechanism intermediate said buoys and shaft which rotates the shaft by the reciprocatory motion of said buoys, substantially as described.

ISAIAH L. ROBERTS.

Witnesses:
A. S. FITCH,
DEMAS BARNES.